United States Patent
Hatono et al.

(10) Patent No.: US 6,252,036 B1
(45) Date of Patent: Jun. 26, 2001

(54) PROCESS FOR PRODUCING POLYCARBONATE RESIN

(75) Inventors: Kazuki Hatono; Hiroaki Kaneko; Toru Sawaki; Katsushi Sasaki, all of Yamaguchi (JP)

(73) Assignee: Teijin Limited, Osaka (JP)

( * ) Notice: Subject to any disclaimer, the term of this patent is extended or adjusted under 35 U.S.C. 154(b) by 0 days.

(21) Appl. No.: 09/402,835

(22) PCT Filed: Apr. 16, 1998

(86) PCT No.: PCT/JP98/01743

§ 371 Date: Oct. 13, 1999

§ 102(e) Date: Oct. 13, 1999

(87) PCT Pub. No.: WO98/47938

PCT Pub. Date: Oct. 29, 1998

(30) Foreign Application Priority Data

Apr. 18, 1997 (JP) ................................ 9-101517

(51) Int. Cl.[7] .................................................... C08G 63/78
(52) U.S. Cl. ............................................ 528/274; 528/272
(58) Field of Search ..................... 528/196, 198, 528/274

(56) References Cited

FOREIGN PATENT DOCUMENTS

| 63-92643 | 4/1988 | (JP) . |
|---|---|---|
| 2-60923 | 3/1990 | (JP) . |
| 2-153925 | 6/1990 | (JP) . |
| 4-88017 | 3/1992 | (JP) . |
| 6-157739 | 6/1994 | (JP) . |
| 8-59975 | 3/1996 | (JP) . |

*Primary Examiner*—Terressa M. Boykin
(74) *Attorney, Agent, or Firm*—Sughrue, Mion, Zinn, Macpeak & Seas, PLLC

(57) ABSTRACT

The purpose of this invention is to produce a stabilized terminal-blocked polycarbonate resin with a limited number of the terminal hydroxy groups having excellent thermal stability, color stability and hydrolysis resistance by an industrially advantageous method using a terminal blocking agent. In the production of a polycarbonate by the melt-polycondensation of an aromatic dihydroxy compound with an aromatic carbonic acid diester in the presence of a polycondensation catalyst, a terminal blocking agent expressed by the following formula (1)

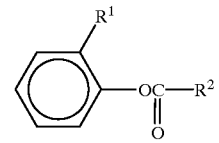

(1)

[in the formula, $R^1$ is chlorine atom, methoxycarbonyl group or ethoxycarbonyl group; $R^2$ is an alkyl group having a carbon number of 1 to 30, an alkoxy group having a carbon number of 1 to 30, an aryl group having a carbon number of 6 to 30 or an aryloxy group having a carbon number of 6–30] is added after the melt-polycondensation to the system in an amount of 0.3 to 4 mol-equivalent based on the hydroxy terminal group amount of the polycarbonate at 200 to 350° C. under a pressure of 1,013 hPa (760 mmHg) or below for 0.1 second or longer and, thereafter, a stabilizer is added and kneaded into the system at 200 to 350° C. under a pressure of $1.333 \times 10^5$ hPa ($10^5$ mmHg) or below for 0.1 second or longer.

17 Claims, No Drawings

PROCESS FOR PRODUCING POLYCARBONATE RESIN

DETAILED DESCRIPTION OF THE INVENTION

1. Technical Field

This invention relates to a process for producing a polycarbonate resin. More particularly, this invention relates to a process for producing a stabilized terminal-blocked polycarbonate resin having low hydroxy terminal group content and excellent thermal stability, color stability and hydrolysis resistance by an industrially desirable method using a terminal blocking agent.

2. Background Arts

Polycarbonate resin is being used in various uses owing to its excellent mechanical properties such as impact resistance and transparency. Known processes for the production of polycarbonate resin include an interfacial process comprising the direct reaction of a dihydroxy compound with phosgene and a melt process comprising the transesterification of a dihydroxy compound with a carbonic acid diester by heating under reduced pressure.

Production of polycarbonate resin usually passes kneading a stabilizer into a polymerized polycarbonate, however, the process has a problem to deteriorate polymer qualities such as thermal stability, color stability and hydrolysis resistance when hydroxy terminal groups remain in the final product of the polycarbonate.

The specification of the Japanese Patent Laid-Open TOKKAIHEI 6-157739 discloses a process for solving the above problem by using at least two reactors in series and adding a terminal blocking agent to at least one reactor containing a polymer having an intrinsic viscosity of 0.20 dl/g or above at the inlet side of the reactor in the case of producing an aromatic polycarbonate resin by the melt-polycondensation of an aromatic dihydroxy compound with a carbonic acid diester. However, the control of the intrinsic viscosity of the final polycarbonate resin is difficult by this process owing to the decomposition of the polycarbonate caused by the reaction by-products, and a satisfiable solution is not yet found at present.

MEANS FOR SOLVING THE PROBLEMS

The object of the present invention relates to a process for producing a polycarbonate resin and is to provide an industrial process for producing a stabilized terminal-blocked polycarbonate resin having a limited number of terminal hydroxy groups and excellent thermal stability, color stability and hydrolysis resistance by blocking the terminal groups taking advantage of the reactivity of the hydroxy terminal groups of a polycarbonate and adding a stabilizer to the terminal blocked polymer.

BEST MODE FOR CARRYING OUT THE INVENTION

The present invention comprises a process for producing a polycarbonate resin characterized by adding a terminal blocking agent under reduced pressure to a polycarbonate produced by melt polycondensation of an aromatic dihydroxy compound with an aromatic carbonic acid diester in the presence of a polycondensation catalyst, kneading of the mixture thereof and then adding a stabilizer to the kneaded mixture.

A stabilized terminal-blocked polycarbonate resin having a limited number of hydroxy terminal groups on the polycarbonate with excellent thermal stability, color stability and hydrolysis resistance can be produced by the polycarbonate resin production process of the present invention.

In the present invention, the polycarbonate subjected to the terminal blocking reaction is a polymer produced by the transesterification of an aromatic dihydroxy compound with an aromatic carbonic acid diester in the presence of a polymerization catalyst in a molten state.

There is no particular restriction to the aromatic dihydroxy compound to be used in the melt polymerization, and examples of the compound are bis(hydroxyaryl)alkanes such as 2,2-bis(4-hydroxyphenyl)propane, 2,2-bis(4-hydroxyphenyl)butane, 2,2-bis(4-hydroxyphenyl)octane, bis(4-hydroxyphenyl)phenylmethane, 2,2-bis(4-hydroxy-3-methylphenyl)propane and 1,1-bis(4-hydroxy-t-butylphenyl)propane, bis(hydroxyaryl)cycloalkanes such as 1,1-bis(4-hydroxyphenyl)cyclopentane and 1,1-bis(hydroxyphenyl)cyclohexane, dihydroxyaryl ethers such as 4,4'-dihydroxydiphenyl ether, dihydroxyaryl sulfides such as 4,4'-dihydroxydiphenyl sulfide, dihydroxyaryl sulfoxides such as 4,4'-dihydroxydiphenyl sulfoxide, and dihydroxyaryl sulfones such as 4,4'-dihydroxydiphenyl sulfone. 2,2-Bis(4-hydroxyphenyl)propane is especially preferable among the above compounds.

The aromatic carbonic acid diester to be used in the melt polymerization is an ester of an optionally substituted aryl group, aralkyl group, etc., having a carbon number of from 6 to 10. Concrete examples of the ester are diphenyl carbonate, ditolyl carbonate, bis(chlorophenyl)carbonate, m-cresyl carbonate, dinaphthyl carbonate and bis(diphenyl) carbonate.

The amount of the above aromatic carbonic acid diester is 1.00 to 1.30 mol, preferably 1.05 to 1.10 mol based on 1 mol of the aromatic dihydroxy compound.

In a melt-polymerization process, a polymerization catalyst is used for increasing the polymerization speed in the case of producing a polycarbonate by the transesterification reaction of an aromatic dihydroxy compound with an aromatic carbonic acid diester.

The polymerization catalyst is composed of an alkali metal compound and/or an alkaline earth metal compound as a main component and, as is necessary, a nitrogen-containing basic compound as a subsidiary component.

Examples of the alkali metal compound are sodium hydroxide, potassium hydroxide, lithium hydroxide, sodium bicarbonate, potassium bicarbonate, lithium bicarbonate, sodium carbonate, potassium carbonate, lithium carbonate, sodium acetate, potassium acetate, lithium acetate, sodium stearate, potassium stearate, lithium stearate, sodium salt, potassium salt or lithium salt of bisphenol A, sodium benzoate, potassium benzoate and lithium benzoate.

Examples of the alkaline earth metal compound are calcium hydroxide, barium hydroxide, magnesium hydroxide, strontium hydroxide, calcium bicarbonate, barium bicarbonate, magnesium bicarbonate, strontium bicarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate.

Examples of the nitrogen-containing basic compound are tetramethylammonium hydroxide, tetraethylammonium hydroxide, tetrabutylammonium hydroxide, trimethylbenzylammonium hydroxide, trimethylamine, triethylamine, dimethylbenzylamine and triphenylamine.

The above polymerization catalysts may be used singly or in combination.

The amount of the polymerization catalyst is selected in the range of from $1\times10^{-8}$ to $1\times10^{-4}$ equivalent, preferably from $1\times10^{-7}$ to $1\times10^{-4}$ equivalent, more preferably $1\times10^{-6}$ to $5\times10^{-5}$ equivalent in the case of an alkali metal compound and/or an alkaline earth metal compound based on 1 mol of the aromatic dihydroxy compound.

In the case of using a nitrogen-containing basic compound as a subsidiary component, its amount is selected within the range between $1\times10^{-5}$ and $1\times10^{-3}$ equivalent, preferably $1\times10^{-5}$ and $5\times10^{-4}$ equivalent based on 1 mol of the aromatic dihydroxy compound.

In the case of using an alkali metal compound and/or an alkaline earth metal compound in combination with a nitrogen-containing basic compound, the total amount of both components is $1\times10^{-8}$ to $1\times10^{-3}$ equivalent, preferably $1\times10^{-7}$ to $1\times10^{-3}$ equivalent, more preferably $1\times10^{-6}$ to $5\times10^{-4}$ equivalent based on 1 mol of the aromatic dihydroxy compound.

Other compounds may be used as cocatalysts as necessary in the melt-polymerization process. Conventional catalysts for esterification reaction and transesterification reaction such as an alkali metal or alkaline earth metal salt of boron or aluminum hydroxide, a quaternary ammonium salt, an alkali metal or alkaline earth metal alkoxide, an organic acid salt of an alkali metal or alkaline earth metal, a zinc compound, a boron compound, a silicon compound, a germanium compound, an organic tin compound, a lead compound, an osmium compound, an antimony compound and a zirconium compound can be used as the above cocatalyst compound, however, the cocatalyst is not restricted by the above examples. The cocatalyst may be used singly or in combination of two or more kinds of cocatalysts.

The melt-polymerization can be carried out by a conventional method by heating the reaction mixture in an inert gas atmosphere under stirring and distilling out the produced aromatic monohydroxy compound.

The reaction temperature is preferably in the range of from 120 to 350° C. in general. The vacuum degree of the system is increased to 10 to 0.1 Torr at the later stage of the reaction to facilitate the distilling out of the produced aromatic monohydroxy compound to complete the reaction.

The polycarbonate to be used in the terminal-blocking reaction of the present invention may take any form such as a pellet form or a molten form. A polycarbonate produced by melt-polymerization is generally supplied continuously in molten state.

The intrinsic viscosity of the polycarbonate is preferably 0.3 or above.

The order of the terminal-blocking operation and the stabilization operation is extremely important in the present invention, and it is necessary to carry out the terminal blocking, first, taking advantage of the reactivity of the hydroxy terminal groups of the polycarbonate which contains a still active polymerization catalyst after the melt polycondensation and, thereafter, to add a stabilizer to the system to neutralise the catalytic activity and stabilize the polymer. A polycarbonate resin having excellent thermal stability, color stability and hydrolysis resistance can be produced by this procedure.

If the stabilization operation is carried out before the terminal blocking operation after the melt-polycondensation, addition of an additional catalyst becomes necessary for performing the terminal blocking operation. Furthermore, when the terminal-blocking reaction is carried out after the stabilization operation, polycarbonate becomes active again (because of the additional catalyst) and the obtained polycarbonate resin ends up with poor thermal stability, color stability and hydrolysis resistance unless an additional stabilization operation after the terminal blocking operation follows according to the present invention.

The reactor for performing the terminal blocking operation in the present invention is preferably a twin-screw extruder, a horizontal reactor, a vertical stirring tank, etc. Use of a twin-screw extruder is preferable because post-treatment such as addition of a stabilizer and degassing (removal of gases and volatile substances) can be carried out simultaneously with the terminal-blocking operation to achieve the simplification of the process and the reduction of the apparatus cost. The horizontal reactor may be a single shaft horizontally-placed reactor or a double-shaft horizontal reactor.

A twin-screw extruder to perform the terminal blocking reaction is preferably provided with unit process zones comprising a kneading part and a vent part. The extruder may have one or plural unit process zones. The kneading part is preferably placed at the upstream side of the vent part based on the flowing direction of the polycarbonate. The kneading part is preferably directly connected to the vent part without a polymer seal part in between. When a polymer seal part is present between the kneading part and the vent part, the decomposition of polycarbonate may occur because the reaction by-products generated in the kneading part cannot be instantaneously removed from the system.

The terminal-blocking agent is preferably added at the kneading part of the unit process zone. The kneading part contains stirring blades such as paddle-type blades usually called as kneading disks to perform kneading of the polycarbonate and the terminal-blocking agent. The feeding port of the terminal-blocking agent at the kneading part is preferably placed at its upstream side based on the flowing direction of the polycarbonate.

The vent part is preferably provided with a screw segment called as a full-flight segment having a polymer conveying function. A venting port is opened on the vent part and the vent part is preferably maintained at a reduced pressure by a vacuum pump, etc.

Omission of a polymer seal part between the kneading part and the vent part enables maintaining at a reduced pressure the kneading part as well as the vent part to facilitate instantaneous removal of the reaction by-products generated in the kneading part and suppress the decomposition of the polycarbonate.

The temperature at the kneading of the polycarbonate with the terminal-blocking agent is from 200 to 350° C., preferably from 240 to 320° C. When the temperature of the polycarbonate resin is lower than 200° C., the kneading of the polycarbonate resin with the terminal-blocking agent becomes difficult. The temperature exceeding 350° C. is also undesirable because accelerated dissipation of the terminal-blocking agent itself from the system lowers the reactivity remarkably and the polycarbonate is more liable to thermally decompose.

The pressure of the kneading process is 1,013 hPa (760 mmHg) or below, preferably 666 hPa (500 mmHg) or below. When the pressure exceeds 1,013 hPa (760 mmHg), by-products generated by the terminal blocking reaction cannot be instantaneously removed from the system to cause undesirable decomposition of polycarbonate.

The kneading time of the polycarbonate and the terminal-blocking agent is controllable by the average residence time of the polycarbonate in the kneading part. In the case of an extruder having plural unit process zones, the kneading time is the sum of the residence times at the zones.

The kneading time is not shorter than 0.1 second. When the kneading time is shorter than the above level, the kneading of the polycarbonate and the terminal-blocking agent becomes difficult to retard the progress of the terminal-blocking reaction.

In the present invention, the resin is preferably evacuated at the vent part under a pressure of 666 hPa (500 mmHg) or below for 0.1 second or longer after kneading the terminal blocking agent. The evacuation treatment is preferably carried out under a pressure lower than the pressure in the kneading of the terminal blocking agent. When the pressure at the vent part exceeds 666 hPa (500 mmHg), by-products generated by the terminal blocking reaction cannot be removed from the system to possibly cause the decomposition of polycarbonate.

The evacuation period at the vent part can be controlled by the average residence time of the polycarbonate at the vent part. In the case of an extruder having plural unit process zones, the evacuation period is defined as the sum of the periods at the individual zones. It is preferably 0.1 second or longer. When the evacuation period is shorter than the above level, generated by-products cannot be removed from the system to possibly cause the decomposition of the polycarbonate or cause the reaction by-products to remain in the produced polycarbonate resulting in the lowering of the quality of the polymer.

The terminal blocking agent to be used in the present invention is a compound expressed by the following formula (1).

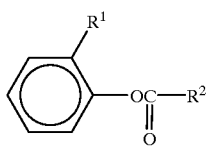

(1)

[in the formula, $R^1$ is chlorine atom, a thoxycarbonyl group or an ethoxycarbonyl group; $R^2$ is an alkyl group having a carbon number of 1 to 30, an alkoxy group having a carbon number of 1 to 30, an aryl group having a carbon number of 6 to 30 or an aryloxy group having a carbon number of 6 to 30, wherein the alkyl group having a carbon number of 1 to 30 and the alkoxy group having a carbon number of 1 to 30 may be replaced with methoxycarbonyl, ethoxycarbonyl, (o-oxycarbon and the aryl group having a carbon number of 6 to 30 and the aryloxy group having a carbon number of 6 to 30 may be replaced with methoxycarbonyl, ethoxycarbonyl, (o-methoxycarbonylphenyl)oxycarbonyl, (o-ethoxycarbonylphenyl)oxycarbonyl, an alkyl having a carbon number of 1 to 30 or an alkoxy having a carbon number of 1–30].

The compound to be used in the present invention and expressed by the above formula (1) includes carbonates and carboxylic acid esters by the definition of the group $R^2$.

In the formula (1), $R^1$ is a chlorine atom, a methoxycarbonyl group ($CH_3OCO-$) or an ethoxycarbonyl group ($C_2H_5OCO-$). Among the above groups, a chlorine atom and a methoxycarbonyl group are preferable, and a methoxycarbonyl group is especially preferable.

The group $R^2$ is an alkyl group having a carbon number of 1 to 30, an alkoxy group having a carbon number of 1 to 30, an aryl group having a carbon number of 6 to 30 or an aryloxy group having a carbon number of 6 to 30.

The alkyl group having a carbon number of 1 to 30 may be a straight-chain group, a branched chain group or a cyclic group or may have an unsaturated group. Examples of such an alkyl group are straight-chain alkyl groups such as methyl group, ethyl group, n-propyl group, n-butyl group, n-pentyl group, n-hexyl group, n-octyl group, n-nonyl group, n-dodecanyl group, n-lauryl group, n-palmityl group or stearyl group, branched alkyl groups such as isopropyl group, t-butyl group or 4-butylnonyl group, alkyl groups having unsaturated groups (alkenyl groups) such as allyl group, butenyl group, pentenyl group, hexenyl group, dodecenyl group or oleyl group, cycloalkyl groups such as cyclopentyl group or cyclohexyl group, etc. Long-chain alkyl groups, concretely lauryl group, stearyl group and dodecenyl group are especially preferable among the above groups from the viewpoint of the improvement of the mold releasability of the polymer.

The alkoxy group having a carbon number of 1 to 30 may be a straight-chain group, a branched chain group or a cyclic group or may have an unsaturated group. Examples of such alkoxy group are straight-chain alkoxy groups such as methoxy group, ethoxy group, n-propoxy group, n-butoxy group, n-pentoxy group, n-hexoxy group, n-octoxy group, n-nonyloxy group, n-decanyloxy group, n-lauryloxy group, n-palmityloxy group or stearyloxy group, branched chain alkoxy groups such as iso-propoxy group, t-butyloxy group or 4-butylnonyloxy group, alkoxy groups having unsaturated groups such as allyloxy group, butenyloxy group, pentenyloxy group, hexenyloxy group, dodecenyloxy group or oleyloxy group, cycloalkyloxy groups such as cyclopentyloxy group or cyclohexyloxy group. Long-chain alkoxy groups such as lauryloxy group, stearyloxy group and dodecenyloxy group are especially preferable among the above groups from the viewpoint of the improvement of the mold-releasability of the polymer.

The above alkyl group having a carbon number of 1 to 30 and alkoxy group having a carbon number of 1 to 30 may be replaced with methoxycarbonyl, ethoxycarbonyl, (o-methoxycarbonylphenyl)-oxycarbonyl

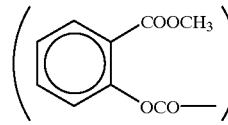

or (o-ethoxycarbonylphenyl)oxycarbonyl.

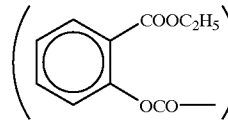

The aryl group having a carbon number of 6 to 30 is, for example, phenyl, naphthyl, biphenyl and anthranyl.

The aryloxy group having a carbon number of 6 to 30 is, for example, phenoxy, naphthoxy, biphenyloxy and anthranyloxy.

These aryl groups having a carbon number of 6 to 30 and aryloxy groups having a carbon number of 6 to 30 may be replaced with methoxycarbonyl, ethoxycarbonyl, (o-methoxycarbonylphenyl)-oxycarbonyl, (o-ethoxycarbonylphenyl)-oxycarbonyl, an alkyl having a carbon number of 1 to 30 or an alkoxy having a carbon number of 1 to 30. Same groups as the above exemplified groups can be cited as examples of the alkyl substituent having a carbon number of 1 to 30 and the alkoxy substituent having a carbon number of 1 to 30.

The compound expressed by the above formula (1) is categorized, based on the definition of $R^2$, into carbonate compounds expressed by the following formula (1)-1

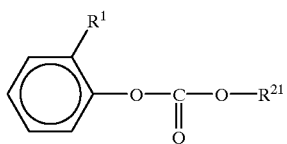
(1)-1 and carboxylic acid aryl esters expressed by the following formula (1)-2

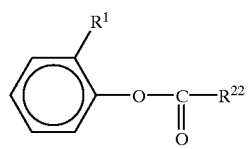
(1)-2

[wherein the definition of $R^1$ is the same as the formula (1); $R^{22}$ is an alkyl group having a carbon number of 1 to 30 or an aryl group having a carbon number of 6 to 30; these groups may be replaced with the substituents defined in the formula (1)].

Examples of the carbonate compounds expressed by the above formula (1)-1 are 2-chlorophenyl aryl carbonates such as 2-chlorophenyl phenyl carbonate, 2-chlorophenyl 4'-methylphenyl carbonate, 2-chlorophenyl 4'-ethylphenyl carbonate, 2-chlorophenyl 4'-n-butylphenyl carbonate, 2-chlorophenyl 4'-t-butylphenyl carbonate, 2-chlorophenyl 4'-nonylphenyl carbonate, 2-chlorophenyl 4'-cumyl carbonate, 2-chlorophenyl naphthyl carbonate, 2-chlorophenyl 4'-methoxyphenyl carbonate, 2-chlorophenyl 4'-ethoxyphenyl carbonate, 2-chlorophenyl 4'-n-butoxyphenyl carbonate, 2-chlorophenyl 4'-t-butoxyphenyl carbonate, 2-chlorophenyl 4'-nonyloxyphenyl carbonate, 2-chlorophenyl 4'-t-propyloxyphenyl carbonate, 2-chlorophenyl 2'-methoxycarbonylphenyl carbonate, 2-chlorophenyl 4'-methoxy-carbonylphenyl carbonate, 2-chlorophenyl 2'-ethoxycarbonylphenyl carbonate, 2-chlorophenyl 4'-ethoxycarbonylphenyl carbonate, 2-chlorophenyl 2'-(o-methoxycarbonylphenyl)oxycarbonylphenyl carbonate or 2-chlorophenyl 2'-(o-ethoxycarbonylphenyl)oxycarbonylphenyl carbonate;

2-chlorophenyl alkyl carbonates such as 2-chlorophenyl methyl carbonate, 2-chlorophenyl ethyl carbonate, 2-chlorophenyl n-butyl carbonate, 2-chlorophenyl octyl carbonate, 2-chlorophenyl i-propyl carbonate, 2-chlorophenyl 2-methoxycarbonylethyl carbonate, 2-chlorophenyl 2-ethoxycarbonylethyl carbonate or 2-chlorophenyl 2-(o-ethoxycarbonylphenyl) oxycarbonylethyl carbonate;

2-methoxycarbonylphenyl aryl carbonates such as 2-methoxy carbonylphenyl phenyl carbonate, 2-methoxycarbonylphenyl methylphenyl carbonate, 2-methoxycarbonylphenyl ethylphenyl carbonate, 2-methoxycarbonylphenyl propylphenyl carbonate, 2-methoxycarbonylphenyl n-butylphenyl carbonate, 2-methoxy-carbonylphenyl t-butylphenyl carbonate, 2-methoxycarbonylphenyl hexylphenyl carbonate, 2-methoxycarbonylphenyl nonylphenyl carbonate, 2-methoxycarbonylphenyl dodecylphenyl carbonate, 2-methoxycarbonylphenyl hexadecylphenyl carbonate, 2-methoxycarbonylphenyl di-n-butylphenyl carbonate, 2-methoxycarbonylphenyl di-t-butylphenyl carbonate, 2-methoxycarbonylphenyl dinonylphenyl carbonate, 2-methoxycarbonylphenyl cyclohexylphenyl carbonate, 2-methoxycarbonylphenyl naphthylphenyl carbonate, 2-methoxycarbonylphenyl biphenyl carbonate, 2-methoxycarbonylphenyl cumylphenyl carbonate, 2-methoxycarbonylphenyl 4'-methoxyphenyl carbonate, 2-methoxycarbonylphenyl 4'-ethoxyphenyl carbonate, 2-methoxycarbonylphenyl 4'-n-butoxyphenyl carbonate, 2-methoxycarbonylphenyl 4'-t-butoxyphenyl carbonate, 2-methoxycarbonylphenyl 4'-nonyloxyphenyl carbonate, 2-methoxycarbonylphenyl 4'-cumyloxyphenyl carbonate, di(2-methoxycarbonylphenyl)carbonate, 2-methoxycarbonylphenyl 4'-methoxycarbonylphenyl carbonate, 2-methoxycarbonylphenyl 2'-ethoxycarbonylphenyl carbonate, 2-methoxycarbonylphenyl 4'-ethoxycarbonylphenyl carbonate, 2-methoxycarbonylphenyl 2'-(o-methoxycarbonylphenyl)oxycarbonylphenyl carbonate, or 2-methoxycarbonylphenyl 2'-(o-ethoxycarbonylphenyl)oxycarbonylphenyl carbonate;

2-methoxycarbonylphenyl alkyl carbonates such as 2-methoxycarbonylphenyl methyl carbonate, 2-methoxycarbonylphenyl ethyl carbonate, 2-methoxycarbonylphenyl n-butyl carbonate, 2-methoxycarbonylphenyl octyl carbonate, 2-methoxycarbonylphenyl nonyl carbonate, 2-methoxycarbonylphenyl cetyl carbonate, 2-methoxycarbonylphenyl lauryl carbonate, 2-methoxycarbonylphenyl 2-methoxycarbonylethyl carbonate, 2-methoxycarbonylphenyl 2-ethoxycarbonylethyl carbonate, 2-methoxycarbonylphenyl 2-(o-methoxycarbonylphenyl) oxycarbonylethyl carbonate or 2-methoxycarbonylphenyl 2-(o-ethoxycarbonylphenyl)oxycarbonylethyl carbonate;

2-ethoxycarbonylphenyl aryl carbonates such as 2-ethoxycarbonylphenyl phenyl carbonate, 2-ethoxycarbonylphenyl methylphenyl carbonate, 2-ethoxycarbonylphenyl ethylphenyl carbonate, 2-ethoxycarbonylphenyl propylphenyl carbonate, 2-ethoxycarbonylphenyl n-butylphenyl carbonate, 2-ethoxycarbonylphenyl t-butylphenyl carbonate, 2-ethoxycarbonylphenyl hexylphenyl carbonate, 2-ethoxycarbonylphenyl nonylphenyl carbonate, 2-ethoxycarbonylphenyl dodecylphenyl carbonate, 2-ethoxycarbonyl-phenyl hexadecylphenyl carbonate, 2-ethoxycarbonylphenyl di-n-butylphenyl carbonate, 2-ethoxycarbonylphenyl di-t-butylphenyl carbonate, 2-ethoxycarbonylphenyl di-t-butylphenyl carbonate, 2-ethoxycarbonylphenyl dinonylphenyl carbonate, 2-ethoxycarbonylphenyl cyclohexylphenyl carbonate, 2-ethoxycarbonylphenyl naphthylphenyl carbonate, 2-ethoxycarbonylphenyl biphenyl carbonate, 2-ethoxycarbonylphenyl cumylphenyl carbonate, 2-ethoxycarbonylphenyl 4'-methoxyphenyl carbonate, 2-ethoxycarbonylphenyl 4'-ethoxyphenyl carbonate, 2-ethoxycarbonylphenyl 4'-n-butoxyphenyl carbonate, 2-ethoxycarbonylphenyl 4'-t-butoxyphenyl carbonate, 2-ethoxycarbonylphenyl 4'-nonyloxyphenyl carbonate, 2-ethoxycarbonylphenyl 4'-cumyloxyphenyl carbonate, di(2-ethoxycarbonylphenyl)carbonate, 2-ethoxycarbonylphenyl 4'-methoxycarbonylphenyl carbonate, 2-ethoxycarbonylphenyl 4'-ethoxycarbonylphenyl carbonate, 2-ethoxycarbonylphenyl 2'-(o-methoxycarbonylphenyl) oxycarbonylphenyl carbonate or 2-ethoxycarbonylphenyl 2'-(o-ethoxycarbonylphenyl)oxycarbonylphenyl carbonate; and 2-ethoxycarbonylphenyl alkyl carbonates such as
2-ethoxycarbonylphenyl methyl carbonate,
2-ethoxycarbonylphenyl ethyl carbonate,
2-ethoxycarbonylphenyl n-butyl carbonate,
2-ethoxycarbonylphenyl octyl carbonate,
2-ethoxycarbonylphenyl 2-methoxycarbonylethyl carbonate, 2-ethoxycarbonylphenyl 2-ethoxycarbonylethyl carbonate,
2-ethoxycarbonylphenyl 2-(o-methoxycarbonylphenyl) oxycarbonyl-ethyl carbonate or 2-ethoxycarbonylphenyl 2-(o-ethoxycarbonylphenyl)oxycarbonylethyl carbonate.

Among the above compounds, 2-methoxycarbonylphenyl phenyl carbonate is preferable because of its excellent hydrolysis resistance (wet-heat resistance) owing to the blocking of the terminal groups with phenyl groups.

Examples of the carboxylic acid aryl esters expressed by the above formula (1)-2 are aromatic carboxylic acid 2-chlorophenyl esters such as 2-chlorophenyl benzoate, 2-chlorophenyl 4-methylbenzoate, 2-chlorophenyl 4-ethylbenzoate, 2-chlorophenyl 4-n-butylbenzoate, 2-chlorophenyl 4-t-butylbenzoate, 2-chlorophenyl 4-nonylbenzoate, 2-chlorophenyl 4-cumylbenzoate, 2-chlorophenyl naphthoate, 2-chlorophenyl 4-methoxybenzoate, 2-chlorophenyl 4-ethoxybenzoate, 2-chlorophenyl 4-n-butoxybenzoate, 2-chlorophenyl 4-t-butoxybenzoate, 2-chlorophenyl 4-nonyloxybenzoate, 2-chlorophenyl 4-cumyloxybenzoate, 2-chlorophenyl 2-methoxycarbonylbenzoate, 2-chlorophenyl 4-methoxycarbonyl-benzoate, 2-chlorophenyl 2-ethoxycarbonylbenzoate, 2-chlorophenyl 4-ethoxycarbonylbenzoate, 2-chlorophenyl 2-(o-methoxycarbonyl-phenyl)oxycarbonylbenzoate or 2-chlorophenyl 2-(o-ethoxycarbonyl-phenyl) oxycarbonylbenzoate;

aliphatic carboxylic acid 2-chlorophenyl esters such as 2-chlorophenyl acetate, 2-chlorophenyl propionate, 2-chlorophenyl valerate, 2-chlorophenyl pelargonate, 2-chlorophenyl 1-methylpropionate, 2-chlorophenyl 2-methoxycarbonylpropionate, 2-chlorophenyl 2-ethoxycarbonylbutyrate, 2-chlorophenyl 4'-(2-methoxycarbonylphenyl)oxycarbonylbutyrate or 2-chlorophenyl 4'-(2-methoxycarbonylphenyl) oxycarbonylbutyrate;

aromatic carboxylic acid (2'-methoxycarbonylphenyl)esters such as (2-methoxycarbonylphenyl)benzoate, 2'-methoxy-carbonylphenyl 4-methylbenzoate, 2'-methoxycarbonylphenyl 4-ethylbenzoate, 2'-methoxycarbonylphenyl 4-n-butylbenzoate, 2'-methoxycarbonylphenyl 4-t-butylbenzoate, 2'-methoxycarbonyl-phenyl naphthoate, 2'-methoxycarbonylphenyl 4-nonylbenzoate, 2'-methoxycarbonylphenyl 4-cumylbenzoate, 2'-methoxycarbonyl-phenyl 4-methoxybenzoate, 2'-methoxycarbonylphenyl 4-ethoxybenzoate, 2'-methoxycarbonylphenyl 4-n-butoxybenzoate, 2'-methoxycarbonylphenyl 4-t-butoxybenzoate, 2'-methoxycarbonyl-phenyl 4-cumyloxybenzoate, 2'-methoxycarbonylphenyl 2-methoxycarbonylbenzoate, 2'-methoxycarbonylphenyl 4-methoxy-carbonylbenzoate, 2'-methoxycarbonylphenyl 4-ethoxycarbonylbenzoate, 2'-methoxycarbonylphenyl 3-(o-methoxycarbonylphenyl) oxycarbonylbenzoate, 2'-methoxycarbonylphenyl 4-(o-methoxycarbonylphenyl)oxycarbonylbenzoate or (2'-methoxycarbonyl)phenyl 3-(o-ethoxycarbonylphenyl) oxycarbonylbenzoate; and aromatic carboxylic acid 2'-ethoxycarbonylphenyl esters such as 2-ethoxycarbonylphenyl benzoate, 2'-ethoxycarbonyl-phenyl 4-methylbenzoate, 2'-ethoxycarbonylphenyl 4-ethylbenzoate, 2'-ethoxycarbonylphenyl 4-n-butylbenzoate, 2'-ethoxycarbonylphenyl 4-t-butylbenzoate, 2'-ethoxycarbonylphenyl naphthoate, 2'-ethoxycarbonylphenyl 4-nonylbenzoate, 2'-ethoxycarbonylphenyl 4-cumylbenzoate, 2'-ethoxycarbonylphenyl 4-methoxybenzoate, 2'-ethoxycarbonylphenyl 4-ethoxybenzoate, 2'-ethoxycarbonylphenyl 4-n-butoxybenzoate, 2'-ethoxycarbonylphenyl 4-t-butoxybenzoate, 2'-ethoxycarbonylphenyl 4-nonyloxybenzoate, 2'-ethoxycarbonyl-phenyl 4-cumyloxybenzoate, 2'-ethoxycarbonylphenyl 2-methoxycarbonylbenzoate, 2'-ethoxycarbonylphenyl 4-ethoxycarbonyl-benzoate, 2'-ethoxycarbonylphenyl 3-(o-methoxycarbonylphenyl) oxycarbonylbenzoate, 2'-ethoxycarbonylphenyl 4-(o-methoxycarbonyl-phenyl)oxycarbonylbenzoate or 2'-ethoxycarbonylphenyl 3-(o-methoxycarbonylphenyl) oxycarbonylbenzoate.

Especially preferable compounds expressed by the formula (1) are 2-methoxycarbonylphenyl benzoate, 2'-methoxycarbonylphenyl 4-cumylbenzoate, 2-ethoxycarbonylphenyl benzoate and 2'-methoxycarbonylphenyl 4-(o-methoxycarbonylphenyl) oxycarbonylbenzoate.

The above-mentioned terminal-blocking agent is added in an amount of 0.3 to 4 mol-equivalent based on the hydroxyl terminal group amount of the polycarbonate. More preferably, the addition amount is 0.5 to 1.5 mol-equivalent. Sufficient terminal-blocking effect cannot be attained when the addition amount of the terminal-blocking agent is less than 0.3 mol-equivalent, and the addition of more than 4 mol-equivalent of the agent is unfavorable because of the lowering of quality caused by the excess agent remaining in the polycarbonate.

For a reactor having plural unit process zones, the sum of the addition amounts of the terminal-blocking agent in individual zones is preferably adjusted to be fallen within the above range.

The present invention enables suppression of the decomposition of polycarbonate caused by the reaction by-products, easy control of the intrinsic viscosity of the polycarbonate resin and quick completion of the terminal blocking reaction to produce a terminal-blocked polycarbonate by adopting the above-mentioned temperature conditions, pressure conditions and kneading time in the kneading part, the pressure conditions and evacuation period in the vent part and further the kind and the addition amount of the terminal-blocking agent.

The above-mentioned terminal blocking reaction conditions are not restricted to the case of using a twin-screw extruder as the terminal blocking reactor but applicable to a horizontal reactor or a vertical stirring tank reactor.

In the above-mentioned process for producing a polycarbonate resin having low hydroxy-terminal content by the reaction of a polycarbonate with a terminal-blocking agent, a polycarbonate resin having further excellent thermal stability, color stability and hydrolysis resistance can be produced by adding a stabilizer to deactivate the catalyst subsequent to the terminal blocking operation.

Conventional stabilizers are effectively usable as the stabilizer, and among others, sulfonic acid ammonium salts, sulfonic acid phosphonium salts and sulfonic acid esters are preferable.

In addition to the above, esters, ammonium salts and phosphonium salts of dodecylbenzenesulfonic acid, and esters, ammonium salts and phosphonium salts of p-toluenesulfonic acid and esters, ammonium salts and phosphonium salts of benzenesulfonic acid may be used as the stabilizer.

Especially preferable compounds among the above compounds are dedecylbenzenesulfonic acid tetrabutylphosphonium salt and p-toluenesulfonic acid tetrabutylammonium salt.

Preferable examples of the sulfonic acid esters are methyl benzenesulfonate, ethyl benzenesulfonate, butyl benzenesulfonate, octyl benzenesulfonate, phenyl benzenesulfonate, methyl p-toluenesulfonate, ethyl p-toluenesulfonate, butyl p-toluenesulfonate, octyl p-toluenesulfonate and phenyl p-toluenesulfonate.

The amount of the stabilizer to be added to a polycarbonate produced by melt-polymerization is 0.5 to 50 mol, preferably 0.5 to 10 mol, more preferable 0.8 to 5 mol based on 1 mol of the above-mentioned main polycondensation catalyst selected from alkali metal compounds and alkaline earth metal compounds. The amount usually corresponds to 0.01 to 500 ppm based on the polycarbonate.

The addition and kneading of the stabilizer are preferably carried out by using a twin-screw extruder provided with unit process zones each of which comprises a kneading part and a vent part with or without a polymer seal part in between. The number of the unit process zones may be one or plural.

The stabilizer can be added to the kneading part directly and/or in the form of a solution. A stirring blade such as a paddle blade is placed in the kneading part to perform the kneading of the polycarbonate with the stabilizer. The kneading part can be placed upstream of the vent part.

The vent part has a vent hole and the inside of the vent part may be maintained under a reduced pressure with a vacuum pump, etc.

The kneading of the polycarbonate and the stabilizer is carried out at 200 to 350° C., preferably 240 to 320° C. under a pressure of $1.333 \times 10^5$ hPa (105 mmHg) or below, preferably $1.333 \times 10^4$ hPa ($10^4$ mmHg) or below for 0.1 second or longer. The kneading at a temperature lower than 200° C. causes difficulty in the kneading of the polycarbonate and the stabilizer, and unfavourable thermal decomposition of polycarbonate takes place by the kneading at a temperature above 350° C. The kneading pressure exceeding $1.333 \times 10^5$ hPa ($10^5$ mmHg) is also unfavorable owing to the problem of the pressure resistance of the reactor.

The addition of the stabilizer in the form of a solution is preferable because the solvent acts as a degassing assistant to effectively accelerate removal of volatile impurities. It is also useful to place another unit process zone comprising a kneading part and a vent part after a unit process zone or unit process zones for the addition of the stabilizer and adding a liquid (e.g. water) which can act as a degassing assistant to the additional unit process zone.

Solvents and volatile impurities can be removed from the system by evacuating the vent part with a vacuum pump, etc. The evacuation is carried out at a pressure of 1,013 hPa (760 mmHg) or below, preferably 666 hPa (500 mmHg) or below for 0.1 seconds or longer. The vent part pressure exceeding 1,013 hPa (760 mmHg) may cause difficulty in removing the added solvents and the volatile impurities from the system.

Water, saturated aliphatic hydrocarbons and aromatic hydrocarbons are preferably used as the solvent for the addition and kneading of the stabilizer in the present invention.

The saturated aliphatic hydrocarbon to be used in the process has a boiling point of preferably 30 to 270° C., more preferably 50 to 200° C., and still more preferably 50 to 150° C. under the atmospheric pressure.

Examples of the saturated aliphatic hydrocarbons are 2-methylbutane, pentane, 2,2-dimethylbutane, 2,3-dimethylbutane, hexane, 2-methylpentane, 3-methylpentane, 2,2-dimethylpentane, 2,3-dimethylpentane, 2,4-dimethylpentane, 3,3-dimethylpentane, heptane, 2-methylhexane, 3-methylhexane, 2,2,3-trimethylbutane, 2,2-dimethylhexane, 2,5-dimethylhexane, 3,4-dimethylhexane, hexamethylethane, 2-methylheptane, 4-methylheptane, octane, 2,2,4-trimethylpentane, 2,3,4-trimethylpentane, nonane, decane, undecane, dodecane, tridecane, tetradecane and 1-pentadecane.

The aromatic hydrocarbon has a boiling point of preferably 80 to 270° C., more preferably 80 to 200° C. and still more preferably 80 to 150° C. under the atmospheric pressure.

Examples of the aromatic hydrocarbons are benzene, toluene, o-xylene, m-xylene, p-xylene, ethylbenzene, 2-ethyltoluene, 3-ethyltoluene, 4-ethyltoluene, cumene, mesitylene, propylbenzene, 1,2,3-trimethylbenzene, 1,2,4-trimethylbenzene, butylbenzene, sec-butylbenzene, tert-butylbenzene, o-cymene, m-cymene, p-cymene, 1,2-diethylbenzene, 1,4-diethylbenzene, 1,2,3,5-tetramethylbenzene, 1,2,4,5-tetramethylbenzene, amylbenzene, 4-tert-butyltoluene, (2,2-dimethylpropyl) benzene, isoamylbenzene, 5-tert-butyl-m-xylene, 1,3-diisopropylbenzene, 1,4-diisopropylbenzene, 1-phenylhexane, 1,2,4-trimethylbenzene and 1,3-di-tert-butylbenzene.

Even if the above terminal-blocking agent and/or stabilizer contain a volatile compound or generate a thermal decomposition product through thermal decomposition, these substances can be removed together with the solvents and the volatile impurities by the evacuation treatment.

The polycarbonate to be used in the addition and kneading of the stabilizer in the present invention may take any form such as pellet form or molten form. A polycarbonate produced by melt-polymerization is generally supplied continuously in molten state.

The terminal-blocking agent and the stabilizer to be added to the system may have any form such as solid, powder or liquid. The environment of the additives may be an ordinary atmosphere, however, when the deterioration of quality is to be especially avoided, it is also recommended to replace the atmosphere beforehand with an inert gas such as nitrogen or argon or, if the additives are in the form of a solution, bubbling (sparging) the solution with an inert gas.

The material of the equipments to perform the melt-polycondensation of the polycarbonate, the addition and kneading of the terminal-blocking agent and the addition and kneading of the stabilizer is preferably a metallic material selected from stainless steel, nickel, nickel alloy, titanium, titanium alloy and steel, and the material for the part contacting with the polymer is preferably stainless steel or steel having nickel coating layer, titanium alloy coating layer or chromium coating layer. Use of materials other than the above materials may cause deactivation of the polycondensation catalyst, delay in polymerization of polycarbonate or the terminal blocking reaction or discoloring of the polycarbonate.

The stainless steel to be used in the present invention is, for example, SUS201, SUS202, SUS301, SUS302, SUS302E, SUS303, SUS303Se, SUS304, SUS304L, SUS305, SUS308, SUS308L, SUS309, SUS309S, SUS309Mo, SUS310, SUS310S, SUS312, SUS316, SUS316L, SUS317, SUS317L, SUS318, SUS321, SUS327, SUS329, SUS330, SUS347, SUS384, SUS385, SUS403, SUS405, SUS410, SUS416, SUS420, SUS420F, SUS429, SUS430, SUS430F, SUS431, SUS434, SUS440A, SUS440B, SUS440C, SUS440F, SUS446, SUS630, SUS631 and SUS661.

Examples of the nickel and the nickel alloys are pure nickel metal, low carbon nickel (NLC), nickel-aluminum-titanium alloy (ND), nickel-chromium-boron-silicon alloy, Monel metal, Monel K-500, Monel 400, K Monel, S Monel, Hastelloy A, Hastelloy B, Hastelloy C, Hastelloy D, Hastelloy F, Nichrome, Incoloy, Incoloy 800, Inconel 600, Inconel 625, Inconel 718, Inconel X, Illium G, Ni-O-Nel, Carpenter 20 and worsite.

Examples of the titanium and the titanium alloys are pure titanium metal, titanium plate (TP35), titanium-palladium alloy, titanium nitride and titanium carbide.

Examples of the steel are SS34, SS41, SS50 and SS55 as steel for general structural purpose, SKD-11 as alloy tool steel, SM-41, SM-50, SM-50Y, SM-53 and SM-58 as steel with improved weatherability and SUH309 and SUH409 as heat-resisting steel.

The above abbreviations such as SUS201, SS34, etc. are notations of JIS specifications.

The above stainless steel, nickel, nickel alloy, titanium, titanium alloy and steel are preferably subjected as necessary to various heat-treatment such as burn-in, annealing, hardening, tempering, cementation, nitriding, sulfurization and supzero treatment to improve the strength.

A lining structure (double-layer structure) using two or more kinds of materials selected from the above materials may be adopted in the reactor to be used in the present invention. A hard metallic material having excellent abrasion resistance and corrosion resistance has to be used at the part contacting with the polymer.

Stainless steels or steels having nickel coating layer, titanium alloy coating layer or chromium coating layer may be used at the part contacting with the polymer.

In the case of using the above-mentioned coated metal, it is preferable to apply various heat-treatment such as burn-in, annealing, hardening, tempering, cementation, nitriding, sulfurization and supzero treatment to improve the strength.

Although there is no particular restriction on the kind of the stainless steel or steel to be used in the coating, use of the above-mentioned stainless steels and steels is preferable.

Decomposition of polycarbonate by the by-product of terminal blocking reaction, a problem inherent to conventional process, was suppressed and the intrinsic viscosity of the finally produced polycarbonate resin became easily controllable by the use of this process for the production of polycarbonate resin.

A polycarbonate resin containing a limited number of hydroxy terminals and having excellent thermal stability, color stability and hydrolysis resistance can be produced by the process of the present invention. The molded article of the produced polycarbonate resin has remarkably improved quality.

EFFECT OF THE INVENTION

A polycarbonate resin containing a limited number of hydroxy terminals and having excellent thermal stability, color stability and hydrolysis resistance can be produced according to the process of the present invention, wherein, in the process of the melt-polycondensation of an aromatic dihydroxy compound with an aromatic carbonic acid diester in the presence of a polycondensation catalyst, a terminal-blocking agent is added and kneaded into the system under a reduced pressure after the melt-polycondensation reaction followed by the addition of a stabilizer to the kneaded mixture.

EXAMPLES

The present invention is described by the following Examples. The physical properties, etc. of the polycarbonate in the following Examples were measured by the following methods.

The intrinsic viscosity was measured by using a methylene chloride solution of a polycarbonate having a concentration of 0.7 g/dl at 20° C. with a Ubbellohde viscometer.

The color of pellet was determined by using a color-difference meter ND-1001DP manufactured by Nihon Denshoku Ind. Co., measuring the Lab values by the reflection method and using the b value as a measure of yellowness.

The amount of terminal hydroxyl group in the polycarbonate resin was determined by dissolving 0.02 g of a specimen in 0.4 ml of chloroform and determining the value at 20° C. by using 1H-NMR (EX-270, product of JEOL Ltd.)

Example 1

Diphenyl carbonate and 2,2-bis(4-hydroxyphenyl) propane were charged into a melting tank furnished with a stirrer at a ratio of 1.05 mol of the former per 1 mol of the latter, the atmosphere in the tank was replaced with nitrogen and the content of the tank was melted at 150° C.

The molten mixture was transferred to a vertical stirring tank furnished with a fractionation column, added with $2 \times 10^{-6}$ equivalent of bisphenol A disodium salt and $1 \times 10^{-4}$ equivalent of tetramethylammonium hydroxide based on 1 mol of 2,2-bis(4-hydroxyphenyl)propane and reacted with each other while keeping the system at a reaction temperature of 180° C. and a reaction pressure of 133.3 hPa (100 mmHg) and removing the produced phenol through the fractionation column, and subsequently the reaction mixture was subjected to prepolymerization at a reaction temperature of 200° C. under a reaction pressure of 40.0 hPa (30 mmHg).

The prepolymerized polymer was transferred to a vertical stirring tank without fractionation column and maintained at 270° C. and 1.333 hPa (1 mmHg) to produce a polycarbonate with the targeted intrinsic viscosity of 0.35 and the whole quantity of the produced polycarbonate was pelletized. SUS316 was used as the material of the melting tank and the vertical stirring tank.

The obtained pellet had an intrinsic viscosity of 0.354, a b-value of the Lab color system of 0.3 and a terminal hydroxyl group content of 100 mol/ton.

The produced polycarbonate pellets were supplied to a twin-screw extruder having an inner diameter of 30 mm, provided with three-stage addition ports with three-stage vent holes, having an extrusion capacity of 5 kg/hr and operated at a rotational speed of 200 rpm, added with 1.5 mol-equivalent of 2-methoxycarbonylphenyl phenyl carbonate based on the hydroxy terminal group amount of the polycarbonate and subjected to terminal blocking reaction under the conditions shown in the Table 1.

Thereafter, dodecylbenzenesulfonic acid tetrabutylphosphonium salt was added as a stabilizer to the twin-screw extruder in the form of an aqueous solution and kneaded into the polycarbonate. The addition and kneading of the stabilizer was carried out at an addition amount of 20 ppm based on the polycarbonate at an extrusion rate of 5 kg/hr, a rotational speed of 200 rpm, a resin temperature of 290° C., a kneading pressure of $1.333 \times 10^4$ hPa ($10^4$ mmHg), a kneading time of 20 seconds, a vent-part pressure of 20.0 hPa (15 mmHg) and a venting period of 20 seconds and using a single unit process zone.

The whole quantity of the polycarbonate resin produced by the above production process was pelletized.

The material of the twin-screw extruder used in the terminal-blocking reaction and the addition and kneading of the stabilizer was a nickel-chromium-boron-silicon alloy for the inner face of the cylinder and SKD-11 having titanium nitride coating layer for the screw segment.

The measured results of the amount of hydroxy terminal, the intrinsic viscosity and the b-value of the Lab color system of the finally obtained polycarbonate resin are shown in the Table 1.

TABLE 1

| Terminal Blocking Reaction | Reactor | | Example 1 Twin Screw Extruder |
|---|---|---|---|
| | Terminal Blocking Agent | | (structure with COOCH3, OCO) |
| | Amount of the Blocking Agent (mol-equiv) | | 1.5 |
| | No. of Unit Process Zones | | 2 |
| | Resin Temp. (° C.) | | 290 |
| | Kneading Part | Pressure (mmHg) | 100 |
| | | Reaction Time (sec) | 20 |
| | Vent Part | Pressure (mmHg) | 5 |
| | | Reaction Time (sec) | 20 |
| Experimental Result | Intrinsic Viscosity | | 0.347 |
| | b-Value of the Lab Color System | | 1.3 |
| | Amount of Hydroxy Terminal (mol/ton) | | 18 |

Examples 2 to 15

Polycarbonate resins were produced under the conditions of the Example 1 except for the terminal-blocking reaction performed under the conditions shown in the Tables 2 to 8 and the whole quantity of the produced resins were pelletized.

The measured results of the amount of hydroxy terminal, the intrinsic viscosity and the b-value of the Lab color system of the finally obtained polycarbonate resins are shown in the Tables 2 to 8.

TABLE 2

| Terminal Blocking Reaction | Reactor | | Example 2 Twin Screw Extruder | Example 3 Twin Screw Extruder |
|---|---|---|---|---|
| | Terminal Blocking Agent | | (structure with COOCH3, OCO) | (structure with COOCH3, OCO) |
| | Amount of the Agent (mol-equivalent) | | 0.5 | 4 |
| | No. of Unit Process Zones | | 2 | 2 |
| | Resin Temp. (° C.) | | 290 | 290 |
| | Kneading Part | Pressure (mmHg) | 100 | 100 |
| | | Reaction Time (sec) | 20 | 20 |
| | Vent Part | Pressure (mmHg) | 5 | 5 |
| | | Reaction Time (sec) | 20 | 20 |
| Experimental Results | Intrinsic Viscosity | | 0.352 | 0.345 |
| | b-Value of the Lab Color System | | 1.2 | 1.4 |
| | Amount of Hydroxy Terminal (mol/ton) | | 57 | 9 |

TABLE 3

| Terminal Blocking Reaction | | | Example 4<br>Twin Screw Extruder | Example 5<br>Twin Screw Extruder |
|---|---|---|---|---|
| | Reactor | | | |
| | Terminal Blocking Agent | | COOCH3-phenyl-OCO-phenyl (with =O) | COOCH3-phenyl-OCO-phenyl (with =O) |
| | Amount of the Agent (mol-equivalent) | | 1.5 | 1.5 |
| | No. of Unit Process Zones | | 3 | 1 |
| | Resin Temp. (° C.) | | 290 | 290 |
| | Kneading Part | Pressure (mmHg) | 100 | 100 |
| | | Reaction Time (sec) | 30 | 10 |
| | Vent Part | Pressure (mmHg) | 5 | 5 |
| | | Reaction Time (sec) | 30 | 10 |
| Experimental Results | Intrinsic Viscosity | | 0.350 | 0.349 |
| | b-Value of the Lab Color System | | 1.3 | 1.3 |
| | Amount of Hydroxy Terminal (mol/ton) | | 5 | 31 |

TABLE 4

| Terminal Blocking Reaction | | | Example 6<br>Twin Screw Extruder | Example 7<br>Twin Screw Extruder |
|---|---|---|---|---|
| | Reactor | | | |
| | Terminal Blocking Agent | | COOCH3-phenyl-OCO-phenyl (with =O) | COOCH3-phenyl-OCO-phenyl (with =O) |
| | Amount of the Agent (mol-equivalent) | | 1.5 | 1.5 |
| | No. of Unit Process Zones | | 2 | 2 |
| | Resin Temp. (° C.) | | 290 | 290 |
| | Kneading Part | Pressure (mmHg) | 760 | 7 |
| | | Reaction Time (sec) | 20 | 20 |
| | Vent Part | Pressure (mmHg) | 5 | 5 |
| | | Reaction Time (sec) | 20 | 20 |
| Experimental Results | Intrinsic Viscosity | | 0.350 | 0.353 |
| | b-Value of the Lab Color System | | 1.2 | 1.3 |
| | Amount of Hydroxy Terminal (mol/ton) | | 15 | 25 |

TABLE 5

| Terminal Blocking Reaction | | Example 8<br>Twin Screw Extruder | Example 9<br>Twin Screw Extruder |
|---|---|---|---|
| | Reactor | | |
| | Terminal Blocking Agent | COOCH3-phenyl-OCO-phenyl (with =O) | COOCH3-phenyl-OCO-phenyl (with =O) |
| | Amount of the Agent (mol-equivalent) | 1.5 | 1.5 |
| | No. of Unit Process Zones | 2 | 2 |
| | Resin Temp. (° C.) | 290 | 290 |

TABLE 5-continued

| Terminal Blocking Reaction | Reactor | | Example 8<br>Twin Screw Extruder | Example 9<br>Twin Screw Extruder |
|---|---|---|---|---|
| | Kneading Part | Pressure (mmHg) | 100 | 100 |
| | | Reaction Time (sec) | 300 | 20 |
| | Vent Part | Pressure (mmHg) | 5 | 5 |
| | | Reaction Time (sec) | 20 | 300 |
| Experimental Results | Intrinsic Viscosity | | 0.348 | 0.353 |
| | b-Value of the Lab Color System | | 1.5 | 1.0 |
| | Amount of Hydroxy Terminal (mol/ton) | | 17 | 10 |

TABLE 6

| Terminal Blocking Reaction | Reactor | | Example 10<br>Twin Screw Extruder | Example 11<br>Twin Screw Extruder |
|---|---|---|---|---|
| | Terminal Blocking Agent | | (structure: methyl salicylate benzoate) | (structure: methyl salicylate benzoate) |
| | Amount of the Agent (mol-equivalent) | | 1.5 | 1.5 |
| | No. of Unit Process Zones | | 2 | 2 |
| | Resin Temp. (° C.) | | 290 | 290 |
| | Kneading Part | Pressure (mmHg) | 100 | 100 |
| | | Reaction Time (sec) | 20 | 20 |
| | Vent Part | Pressure (mmHg) | 1 | 100 |
| | | Reaction Time (sec) | 20 | 20 |
| Experimental Results | Intrinsic Viscosity | | 0.351 | 0.345 |
| | b-Value of the Lab Color System | | 1.1 | 1.4 |
| | Amount of Hydroxy Terminal (mol/ton) | | 18 | 25 |

TABLE 7

| Terminal Blocking Reaction | Reactor | | Example 12<br>Twin Screw Extruder | Example 13<br>Twin Screw Extruder |
|---|---|---|---|---|
| | Terminal Blocking Agent | | (structure: methyl salicylate benzoate) | (structure: methyl salicylate benzoate) |
| | Amount of the Agent (mol-equivalent) | | 1.5 | 1.5 |
| | No. of Unit Process Zones | | 2 | 2 |
| | Resin Temp. (° C.) | | 250 | 315 |
| | Kneading Part | Pressure (mmHg) | 100 | 100 |
| | | Reaction Time (sec) | 20 | 20 |
| | Vent Part | Pressure (mmHg) | 5 | 5 |
| | | Reaction Time (sec) | 20 | 20 |
| Experimental Results | Intrinsic Viscosity | | 0.348 | 0.346 |
| | b-Value of the Lab Color System | | 1.1 | 1.4 |
| | Amount of Hydroxy Terminal (mol/ton) | | 19 | 20 |

TABLE 8

| Terminal Blocking Reaction | | Example 14<br>Twin Screw Extruder | Example 15<br>Twin Screw Extruder |
|---|---|---|---|
| | Reactor | | |
| | Terminal Blocking Agent | 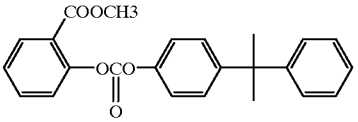 | 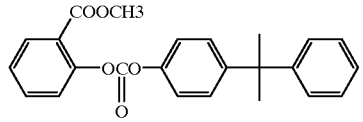 |
| | Amount of the Agent (mol-equivalent) | 1.5 | 0.8 |
| | No. of Unit Process Zones | 2 | 1 |
| | Resin Temp. (° C.) | 290 | 290 |
| | Kneading Part Pressure (mmHg) | 100 | 100 |
| | Reaction Time (sec) | 20 | 10 |
| | Vent Part Pressure (mmHg) | 5 | 5 |
| | Reaction Time (sec) | 20 | 10 |
| Experimental Results | Intrinsic Viscosity | 0.345 | 0.349 |
| | b-Value of the Lab Color System | 1.5 | 1.2 |
| | Amount of Hydroxy Terminal (mol/ton) | 3 | 14 |

Example 16

A polycarbonate resin was produced under the conditions of the Example 1 except for the terminal-blocking reaction performed by using a horizontal reactor (made of SUS316) at an extrusion rate of 20 kg/hr and a rotational speed of 10 rpm under conditions shown in the Table 9 and the whole quantity of the produced resin was pelletized.

The measured results of the amount of hydroxy terminal, the intrinsic viscosity and the b-value of the Lab color system of the finally obtained polycarbonate resins are shown in the Table 9.

Example 17

A polycarbonate resin was produced under the conditions of the Example 1 except for the terminal-blocking reaction performed by using a single shaft horizontal reactor (made of SUS316) at an extrusion rate of 20 kg/hr and a rotational speed of 10 rpm under conditions shown in the Table 10 and the whole quantity of the produced resin was pelletized.

The measured results of the amount of hydroxy terminal, the intrinsic viscosity and the b value of the Lab color system of the finally obtained polycarbonate resins are shown in the Table 10.

TABLE 9

| Terminal Blocking Reaction | | Example 16<br>Double Shaft Horizontal Reactor |
|---|---|---|
| | Reactor | |
| | Terminal Blocking Agent | 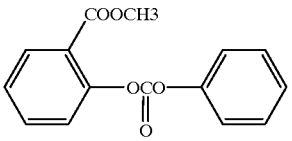 |
| | Amount of the Blocking Agent (mol-equiv) | 1.0 |
| | No. of Unit Process Zones | 1 |
| | Resin Temp. (° C.) | 270 |
| | Kneading Part Pressure (mmHg) | 760 |
| | Reaction Time (sec) | 60 |
| | Vent Part Pressure (mmHg) | 1 |
| | Reaction Time (sec) | 3600 |
| Experimental Result | Intrinsic Viscosity | 0.355 |
| | b-Value of the Lab Color System | 1.2 |
| | Amount of Hydroxy Terminal (mol/ton) | 9 |

TABLE 10

| Terminal Blocking Reaction | | Example 17 |
|---|---|---|
| | Reactor | Single Shaft Horizontal Reactor |
| | Terminal Blocking Agent | 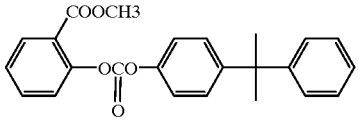 |
| | Amount of the Blocking Agent (mol-equiv) | 1.0 |
| | No. of Unit Process Zones | 1 |
| | Resin Temp. (° C.) | 270 |
| | Kneading Part  Pressure (mmHg) | 1 |
| | Reaction Time (sec) | 0.1 |
| | Vent Part  Pressure (mmHg) | 1 |
| | Reaction Time (sec) | 2400 |
| Experimental Result | Intrinsic Viscosity | 0.353 |
| | b-Value of the Lab Color System | 1.3 |
| | Amount of Hydroxy Terminal (mol/ton) | 21 |

Example 18

Diphenyl carbonate and 2,2-bis(4-hydroxyphenyl)propane were charged into a melting tank furnished with a stirrer at a ratio of 1.05 mol of the former per 1 mol of the latter, the atmosphere in the tank was replaced with nitrogen and the content of the tank was melted at 150° C.

The molten mixture was transferred to a vertical stirring tank furnished with a fractionation column, added with 2×10$^{-6}$ equivalent of bisphenol A disodium salt and 1×10$^{-4}$ equivalent of tetramethylammonium hydroxide based on 1 mol of 2,2-bis(4-hydroxyphenyl)propane and reacted with each other while keeping the system at a reaction temperature of 180° C. and a reaction pressure of 133.3 hPa (100 mmHg) and removing the produced phenol through the fractionation column, and subsequently the reaction mixture was subjected to prepolymerization at a reaction temperature of 200° C. under a reaction pressure of 40.0 hPa (30 mmHg).

The prepolymerized polymer was transferred to a vertical stirring tank without a fractionation column and maintained at 270° C. and 1.333 hPa (1 mmHg) to produce a polycarbonate with the targeted intrinsic viscosity of 0.35.

2-Methoxycarbonylphenyl phenyl carbonate was added as a terminal-blocking agent to the vertical stirring tank in an amount of 1.0 mol-equivalent based on the hydroxy terminal group amount of the polycarbonate, the terminal blocking reaction was carried out under the addition kneading conditions shown in the Table 11, and the whole quantity of the produced polycarbonate was pelletized.

The produced polycarbonate pellets were supplied to a twin-screw extruder having an inner diameter of 30 mm and provided with three-stage addition ports with three-stage vent holes, and dodecylbenzenesulfonic acid tetrabutylphosphonium salt was added as a stabilizer to the kneading part of the twin-screw extruder in the form of an aqueous solution and kneaded into the polycarbonate. The addition and kneading of the stabilizer was carried out at an addition amount of 20 ppm based on the polycarbonate at an extrusion rate of 5 kg/hr, a rotational speed of 200 rpm, a kneading pressure of 1.333×10$^4$ hPa (10$^4$ mmHg), a kneading time of 20 seconds, a vent-part pressure of 20.0 hPa (15 mmHg) and a venting period of 20 seconds.

The whole quantity of the polycarbonate resin produced by the above production process was pelletized.

The material of the twin-screw extruder used in the addition and kneading of the stabilizer was a nickel-chromium-boron-silicon alloy for the inner face of the cylinder and SKD-11 having titanium nitride coating layer for the screw segment.

The measured results of the amount of hydroxy terminal, the intrinsic viscosity and the b-value of the Lab color system of the finally obtained polycarbonate resin are shown in the Table 11.

TABLE 11

| Terminal Blocking Reaction | | Example 18 |
|---|---|---|
| | Reactor | Vertical Stirring Tank |
| | Terminal Blocking Agent | 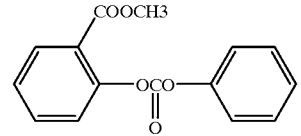 |
| | Amount of the Blocking Agent (mol-equiv) | 1.0 |
| | No. of Unit Process Zones | 1 |
| | Resin Temp (° C.) | 270 |
| | Kneading Part  Pressure (mmHg) | 100 |
| | Reaction Time (sec) | 600 |

TABLE 11-continued

| Terminal Blocking Reaction | Reactor | | Example 18 Vertical Stirring Tank |
|---|---|---|---|
| | Vent Part | Pressure (mmHg) | 1 |
| | | Reaction Time (sec) | 1200 |
| Experimental Result | Intrinsic Viscosity | | 0.355 |
| | b-Value of the Lab Color System | | 0.8 |
| | Amount of Hydroxy Terminal (mol/ton) | | 10 |

Examples 19 to 24

Polycarbonate resins were produced under the conditions of the Example 1 except for the addition and kneading of the stabilizer performed under the conditions shown in the Tables 12 to 14, and the whole quantity of the produced resins were pelletized.

The measured results of the amount of hydroxy terminal, the intrinsic viscosity and the b-value of the Lab color system of the finally obtained polycarbonate resins are shown in the Tables 12 to 14.

TABLE 12

| | | | Example 19 | Example 20 |
|---|---|---|---|---|
| Addition and Kneading of Stabilizer | Reactor | | Twin Screw Extruder | Twin Screw Extruder |
| | | Extrusion Rate (kg/hr) | 5 | 5 |
| | | Rotational Speed (rpm) | 200 | 200 |
| | | Stabilizer | Dodecylbenzenesulfonic acid tetrabutylphosphonium salt | Dodecylbenzenesulfonic acid tetrabutylphosphonium salt |
| | | Adding Form of Stabilizer | Aqueous Solution | Aqueous Solution |
| | | Amount of Stabilizer (ppm) | 20 | 20 |
| | | No. of Unit Process Zones | 1 | 1 |
| | | Resin Temp. (° C.) | 250 | 315 |
| | | Kneading Part | | |
| | | Pressure (mmHg) | $10^4$ | $10^4$ |
| | | Reaction Time (sec) | 20 | 20 |
| | | Vent Part | | |
| | | Pressure (mmHg) | 15 | 15 |
| | | Reaction Time (sec) | 20 | 20 |
| Experimental Result | Intrinsic Viscosity | | 0.351 | 0.346 |
| | b-Value of the Lab Color System | | 1.0 | 1.5 |
| | Amount of Hydroxy Terminal (mol/ton) | | 22 | 18 |

TABLE 13

| | | | Example 21 | Example 22 |
|---|---|---|---|---|
| Addition and Kneading of Stabilizer | Reactor | | Twin Screw Extruder | Twin Screw Extruder |
| | | Extrusion Rate (kg/hr) | 5 | 5 |
| | | Rotational Speed (rpm) | 200 | 200 |
| | | Stabilizer | Dodecylbenzenesulfonic acid tetrabutylphosphonium salt | Dodecylbenzenesulfonic acid tetrabutylphosphonium salt |
| | | Adding Form of Stabilizer | Aqueous Solution | Undiluted Stock Liquid |
| | | Amount of Stabilizer (ppm) | 20 | 20 |
| | | No. of Unit Process Zones | 1 | 1 |
| | | Resin Temp. (° C.) | 290 | 290 |
| | | Kneading Part | | |
| | | Pressure (mmHg) | 760 | 760 |
| | | Reaction Time (sec) | 20 | 20 |
| | | Vent Part | | |
| | | Pressure (mmHg) | 15 | 15 |
| | | Reaction Time (sec) | 20 | 20 |

TABLE 13-continued

|  |  | Example 21 | Example 22 |
|---|---|---|---|
| Experimental Result | Intrinsic Viscosity | 0.351 | 0.348 |
|  | b-Value of the Lab Color System | 1.1 | 1.3 |
|  | Amount of Hydroxy Terminal (mol/ton) | 20 | 17 |

TABLE 14

|  |  | Example 23 | Example 24 |
|---|---|---|---|
| Addition and Kneading of Stabilizer | Reactor | Twin Screw Extruder | Twin Screw Extruder |
|  | Extrusion Rate (kg/hr) | 5 | 5 |
|  | Rotational Speed (rpm) | 200 | 200 |
|  | Stabilizer | p-Toluenesulfonic acid tetrabutylammonium salt | Butyl p-toluenesulfonate |
|  | Adding Form of Stabilizer | Aqueous Solution | Aqueous Solution |
|  | Amount of Stabilizer (ppm) | 14 | 8 |
|  | No. of Unit Process Zones | 1 | 1 |
|  | Resin Temp. (° C.) | 290 | 290 |
|  | Kneading Part |  |  |
|  | Pressure (mmHg) | $10^4$ | $10^4$ |
|  | Reaction Time (sec) | 20 | 20 |
|  | Vent Part |  |  |
|  | Pressure (mmHg) | 15 | 15 |
|  | Reaction Time (sec) | 20 | 20 |
| Experimental Result | Intrinsic Viscosity | 0.347 | 0.345 |
|  | b-Value of the Lab Color System | 1.3 | 1.4 |
|  | Amount of Hydroxy Terminal (mol/ton) | 18 | 15 |

Example 25

A polycarbonate was produced under the conditions of the Example 1 except for the use of $2\times10^{-8}$ equivalent of bisphenol A disodium salt based on 1 mol of 2,2-bis(4-hydroxyphenyl)propane, and the whole quantity of the produced resin was pelletized.

The obtained pellet had an intrinsic viscosity of 0.354, a b-value of the Lab color system of 0.29 and a hydroxy terminal content of 95 mol/ton.

The terminal blocking reaction and the addition and kneading of a stabilizer were performed on the obtained polycarbonate pellet under the conditions of the Example 1 except for the use of 2 ppm of the stabilizer based on the polycarbonate.

The measured results of the amount of hydroxy terminal, the intrinsic viscosity and the b-value of the Lab color system of the finally obtained polycarbonate resins are shown in the Table 15.

TABLE 15

|  |  |  | Example 25 |
|---|---|---|---|
| Terminal Blocking Reaction | Reactor |  | Twin Screw Extruder |
|  | Terminal Blocking Agent |  | (phenyl 2-(methoxycarbonyl)phenyl carbonate structure: benzene ring with COOCH3 and O-C(=O)-O-phenyl substituents) |
|  | Amount of the Blocking Agent (mol-equiv) |  | 1.5 |
|  | No. of Unit Process Zones |  | 2 |
|  | Resin Temp. (° C.) |  | 290 |
|  | Kneading Part | Pressure (mmHg) | 100 |
|  |  | Reaction Time (sec) | 20 |
|  | Vent Part | Pressure (mmHg) | 5 |
|  |  | Reaction Time (sec) | 20 |
| Experimental Result | Intrinsic Viscosity |  | 0.348 |

TABLE 15-continued

| Terminal Blocking Reaction | Reactor | Example 25 Twin Screw Extruder |
|---|---|---|
| | b-Value of the Lab Color System | 1.2 |
| | Amount of Hydroxy Terminal (mol/ton) | 17 |

What is claimed is:

1. A process for the production of a polycarbonate by the melt polycondensation of an aromatic dihydroxy compound with an aromatic carbonic acid diester in the presence of a polycondensation catalyst wherein after the melt polycondensation, the process comprises adding and kneading a terminal blocking agent expressed by the following formula (1)

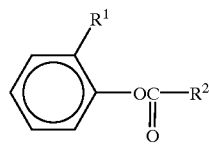
(1)

into the system at 200 to 350° C. under a pressure of 1,013 hPa (760 mmHg) or below for 0.1 second or longer in an amount of 0.3 to 4 mol-equivalent based on the hydroxy terminal group amount of the polycarbonate, and adding and kneading a stabilizer thereafter at 200 to 350° C. under a pressure of $1.333 \times 10^5$ hPa ($10^5$ mmHg) or below for 0.1 second or longer, wherein, $R^1$ is a chlorine atom, a methoxycarbonyl group or an ethoxycarbonyl group; and $R^2$ is an alkyl group having 1 to 30 carbons, an alkoxy group having 1 to 30 carbons, an aryl group having 6 to 30 carbons or an aryloxy group having 6 to 30 carbons in which the alkyl group having 1 to 30 carbons and the alkoxy group having a 1 to 30 carbons may be replaced with methoxycarbonyl, ethoxycarbonyl, (o-methoxycarbonylphenyl)oxycarbonyl or (o-ethoxycarbonylphenyl)oxycarbonyl, and the aryl group having 6 to 30 carbons and the aryloxy group having 6 to 30 carbons may be substituted with methoxycarbonyl, ethoxycarbonyl, (o-methoxycarbonylphenyl)oxycarbonyl, (o-ethoxycarbonylphenyl)oxycarbonyl, an alkyl group having 1 to 30 carbons or an alkoxy group having 1 to 30 carbons.

2. A process described in the claim 1, wherein a twin-screw extruder furnished with one or more unit process zones each comprising a kneading part and a vent part is used in the addition and kneading of a terminal-blocking agent and a terminal blocking agent is added to the kneading part.

3. A process described in the claim 2, wherein the kneading part of the unit process zone is placed at the upstream side of the vent part and the vent part and the kneading part are directly contacted with each other without a polymer seal part in between.

4. A process described in the claim 1, wherein at least one kind of reactor selected from a horizontal reactor and a vertical stirring tank is used in the addition and kneading of the terminal blocking agent.

5. A process described in claim 1 wherein the addition and kneading of the terminal blocking agent are carried out at 240 to 320° C. under a pressure of 666 hPa (500 mmHg) or below.

6. A process described in claim 1 wherein the system is evacuated under a pressure of 666 hPa (500 mmHg) or below for 0.1 second or longer after the kneading of the terminal blocking agent.

7. A process described in claim 1 or 3, wherein the evacuation treatment after the kneading of the terminal blocking agent is carried out under a pressure lower than the pressure in the kneading of the terminal blocking agent.

8. A process described in claim 1, wherein the compound expressed by the aforementioned formula (1) has a structure expressed by the following formula (1)-1

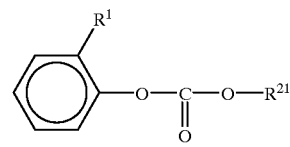
(1)-1 wherein, $R^1$ is a chlorine atom, a methoxycarbonyl group or an ethoxycarbonyl group; and $R^{21}$ is an alkyl group having 1 to 30 carbons or an aryl group having 6 to 30 carbons; wherein the alkyl group and the aryl group may be replaced with methoxycarbonyl, ethoxycarbonyl, (o-methoxy-carbonylphenyl)oxycarbonyl, (o-ethoxycarbonylphenyl)oxycarbonyl, an alkyl group having 1 to 30 carbons or an alkoxy group having a carbon number of 1 to 30 carbons.

9. A process described in claim 1, wherein the compound expressed by the aforementioned formula (1) has a structure expressed by the following formula (1)-2

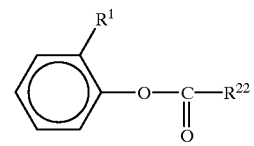
(1)-2 wherein, $R^1$ is a chlorine atom, a methoxycarbonyl group or an ethoxycarbonyl group; and $R^{22}$ is an alkyl group having a 1 to 30 carbons or an aryl group having 6 to 30 carbons, wherein the alkyl group and aryl group may be substituted with methoxycarbonyl, ethoxycarbonyl, (o-methoxy-carbonylphenyl)oxycarbonyl, (o-ethoxycarbonylphenyl)oxycarbonyl, an alkyl group having 1 to 30 carbons or an alkoxy group having 1 to 30 carbons.

10. A process described in claim 1 wherein the polycondensation catalyst is composed of $1 \times 10^{-7}$ to $1 \times 10^{-3}$ equivalent as a whole, based on 1 mol of the aromatic dihydroxy compound, of an alkali metal compound and/or an alkaline earth metal compound and a nitrogen-containing basic compound.

11. A process described in claim 1, wherein a stabilizer is added in an amount of 0.5 to 50 mol based on 1 mol of the polycondensation catalyst.

12. A process described in claim 11 wherein at least one kind of compound selected from sulfonic acid ammonium salts, sulfonic acid phosphonium salts and sulfonic acid esters is used as the stabilizer.

13. A process described in claim 12 wherein at least one kind of compound selected from esters, ammonium salts and phosphonium salts of dodecylbenzene-sulfonic acid is used as the stabilizer.

14. A process described in claim 12 wherein at least one kind of compound selected from p-toluenesulfonic acid esters, p-toluenesulfonic acid ammonium salt, p-toluenesulfonic acid phosphonium salts, benzenesulfonic acid esters, benzenesulfonic acid ammonium salts and benzenesulfonic acid phosphonium salts is used as the stabilizer.

15. A process described in claim 12 wherein a twin-screw extruder having at least one unit process zone comprising a kneading part and a vent part placed at the downstream side of the kneading part with or without a polymer seal part in between is used in the addition of the stabilizer, and the stabilizer is added to the kneading part of the twin-screw extruder directly or in the state of a solution.

16. A process described in claim 15 wherein the evacuation treatment after the kneading of the stabilizer is carried out under a pressure of 1,013 hPa (760 mmHg) or below for 0.1 second or longer.

17. A process described in claim 1 wherein the material of the reactor to perform the melt polycondensation of the polycarbonate, the addition and kneading of the terminal blocking agent and the addition and kneading of the stabilizer is a metallic material selected from stainless steel, nickel, nickel alloy, titanium, titanium alloy and steel or a stainless steel or steel having nickel coating layer, titanium alloy coating layer or chromium coating layer.

* * * * *